(12) United States Patent
D'Ercole et al.

(10) Patent No.: US 6,273,824 B1
(45) Date of Patent: Aug. 14, 2001

(54) FLEXIBLE DIAPHRAGM SHAFT COUPLING ASSEMBLY

(75) Inventors: Steve D'Ercole, Glen Burnie; Charles A Sakers, Glen Arm, both of MD (US)

(73) Assignee: Kop-Flex, Inc., Baltimore, MD (US)

( * ) Notice: Subject to any disclaimer, the term of this patent is extended or adjusted under 35 U.S.C. 154(b) by 0 days.

(21) Appl. No.: 09/314,965

(22) Filed: May 20, 1999

Related U.S. Application Data
(60) Provisional application No. 60/089,838, filed on Jun. 19, 1998.

(51) Int. Cl.[7] .................................................. F16D 3/52
(52) U.S. Cl. ................................ 464/88; 464/98; 464/51
(58) Field of Search .............................. 464/98, 99, 100, 464/101, 51, 88

(56) References Cited

U.S. PATENT DOCUMENTS

| | | | |
|---|---|---|---|
| 2,855,767 | * 10/1958 | Ahlen | 464/98 |
| 4,411,634 | * 10/1983 | Hammelmann | 464/91 |
| 4,741,722 | * 5/1988 | Federn | 464/99 |
| 5,342,242 | * 8/1994 | Ladd et al. | 464/98 |
| 5,586,938 | * 12/1996 | Schurhorster | 464/92 |
| 5,899,813 | * 5/1999 | Bunce | 464/99 |

* cited by examiner

Primary Examiner—Lynne H. Browne
Assistant Examiner—Aaron Dunwoody
(74) Attorney, Agent, or Firm—W. Warren Taltavull; Manelli, Denison & Selter PLLC

(57) ABSTRACT

A flexible coupling between drive and driven shaft members includes a diaphragm member having an offset base and outer periphery that is relatively more flexible than the radially inner base which is formed integrally with one of the shaft members or at least an intermediate coupling sleeve. A transition zone of the diaphragm extends through an arcuate curve to facilitate attachment between the shafts and one that will allow flexing of the diaphragm to accommodate dimensional changes in the shaft members as a result of cooling after assembly of the coupling.

6 Claims, 3 Drawing Sheets

FLEXIBLE DIAPHRAGM SHAFT COUPLING ASSEMBLY

This application claims the benefit of provisional application No. 06/089,838, filed Jun. 19, 1998.

FIELD OF THE INVENTION

The present invention relates to a coupling structure for linking drive and driven shafts which includes a flexible diaphragm for accommodating radial variations in dimensions and which will reduce or eliminate imposition of undesirable stresses on the diaphragm portion of the coupling.

BACKGROUND OF THE INVENTION

In order to accommodate variations in alignment between a drive and driven shaft, it has been the practice to locate a flexible coupling in the path to effect torque transmission. In some constructions, due to either torque magnitude requirements or other structural considerations, substantially more robust couplings are required that are capable of accommodating misalignment or vibration in use. For example, in some high torque load environments and/or high speed transmissions, a metal diaphragm flexible coupling assembly such as disclosed in U.S. Pat. No. 5,000,722 granted Mar. 19, 1991 and U.S. Pat. No. 5,588,917 granted Dec. 31, 1996 is employed.

In a number of torque transmission set ups, a bolted assembly such as is conventionally used with flexible coupling members cannot be employed due to a number of factors such as the types of shafts that require connection, the magnitude of the torque load or the rotational speeds to be imposed on the members or the environment in which the coupling is to be established. In other circumstances, the end user's requirements demand a more sturdy or durable assembly. With such conditions, the attachment of one or both connection elements of the flexible coupling necessitate more secure attachment of the flexible coupling to the drive and driven shafts such as a shrink fitting between the flexible coupling attachment members and the drive and driven shafts. The use of a shrink fitting of the attachment members of a flexible diaphragm type coupling, however, introduces a manufacturing difficulty since the magnitude of the dimensional variation that results from the shrink fitting is often difficult to predict with the required accuracy to assure long life and stable operation of many types of flexible couplings. This is particularly troublesome where the flexible elements of the coupling are metal diaphragms such as disclosed in the aforementioned patent. In other prior art arrangements where a flexible diaphragm is formed integrally about a connection hub or sleeve, the outer peripheral edge of the diaphragm is attached to a connection flange but with the diaphragm placed in one of two conditions. In one condition, the diaphragm is substantially flat or planar in a radial sense. While this condition imposes little or no stress on the diaphragm, the diaphragm has exhibited a tendency to pop or deflect suddenly due to any misalignment or vibration occurring. Such instability can lead to early failure of the coupling as well as damage to the coupled machinery.

In the other condition, the practice has been to deflect the diaphragm prior to placing the coupling in service and prior to shrink fitting the hub of the coupling to a shaft. In this arrangement, when the shrink fitting takes place, the pre-deflected diaphragm could further bend to absorb the radial expansion caused by the presence of a coupled shaft in the hub. However, it has been recognized that this pre-deflection condition frequently places the diaphragm under high stress caused also by the compression caused by shrink fitting of the hub to a shaft. That is to say, where the hub has been heated to allow insertion of a shaft end, the subsequent cooling of the hub in the presence of the shaft limits the shrinkage and can cause or add to the deflection in the diaphragm. This is undesirable in such applications as it often creates stresses throughout the diaphragm element in the assembled condition. Under some conditions, the flexible diaphragm will be deflected such that when vibrated in use, early failure of the coupling may result particularly under high torque loads. Attempts to minimize these conditions in such couplings require extensive testing of the coupling. This is time consuming and expensive for each such coupling for each application to determine the effect of the shrink fitting on the diaphragm or each of them where two are used in the coupling member.

SUMMARY OF THE INVENTION

The present invention provides a sturdy diaphragm type flexible coupling for torque transmission that will accommodate as well as minimize misalignment in operation yet be capable of interfitting with shafts without imposing undesirable stresses on the flexible element or elements of the coupling. In one form, the coupling of the invention includes an attachment hub sleeve having an integrally formed peripheral diaphragm member shaped to tolerate shrink fitting of the sleeve to a shaft so as to minimize or avoid creation of stress on the diaphragm member yet will allow connection in a coupling assembly without requiring extensive testing to compensate for the effect of shrink fitting of the hub on a shaft to be coupled.

In a preferred form, the inner edge of the diaphragm element is formed with a curved, offset inner boundary portion formed integrally with the outer peripheral surface of the hub. The outer portion of the diaphragm element extends substantially symmetrically relative to a plane extending transverse to the axis of rotation of the hub. With this structure, the major portion of the diaphragm element will remain unstressed in the assembled condition as any positional changes resulting from shrink fitting of the hub to a shaft will be aborbed by the inner boundary portion.

BRIEF DESCRIPTION OF THE DRAWINGS

A thorough understanding of the invention will be achieved when consideration is given to the following description taken in conjunction with the drawings, in which.

DETAILED DESCRIPTION OF THE INVENTION

Figure 2:
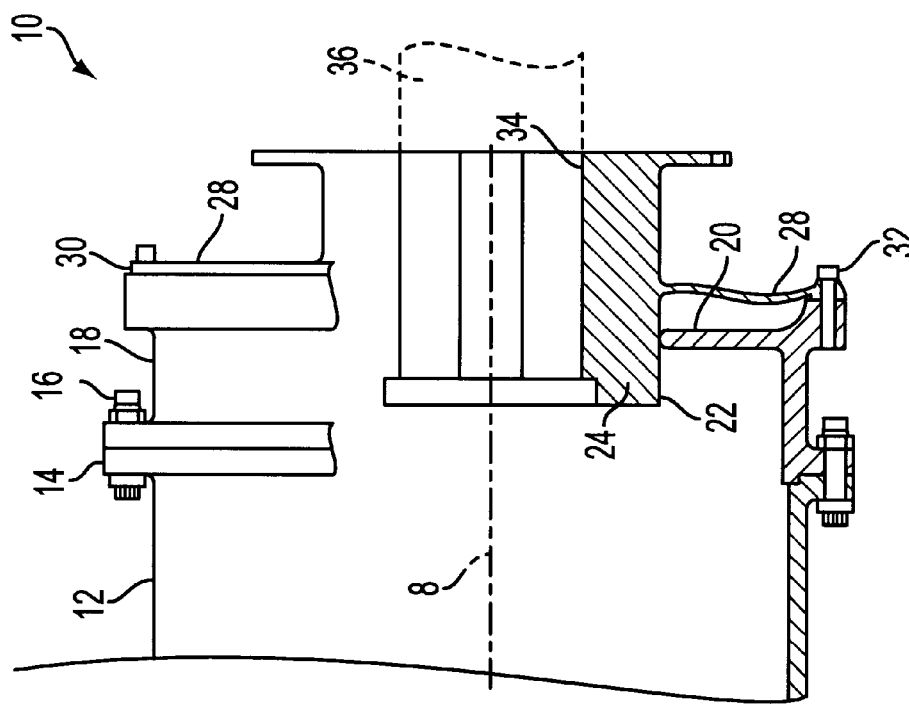
FIG. 2 is view similar to FIG. 1 but showing only one end of an improved coupling assembly of this invention.
Figure 1:
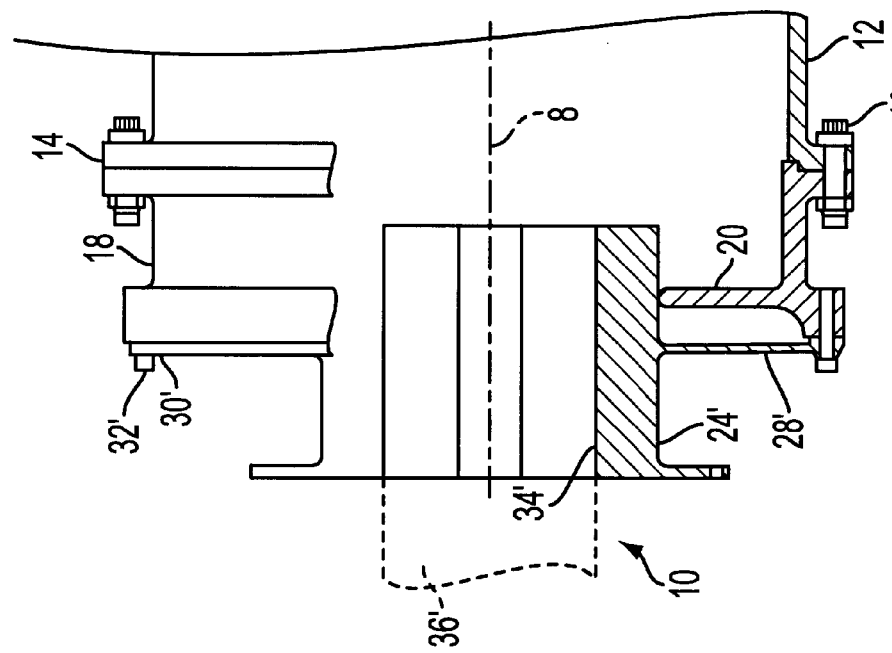
FIG. 1 is side elevational view, partly in section, of a prior art assembly.

Referring to the drawings, and specifically FIG. 1, there is shown a prior art coupling assembly generally designated 10 and which includes a spacer 12 having apertured peripheral flanges 14 at opposite ends thereof. To each of the flanges 14 there is connected, as by bolts 16, an insert sleeve 18. Each of the sleeves 18 is provided adjacent its outer face within an annular spacer 20 which engages the outer periphery 20 of a coupling hub 24. The coupling hub 24 has a significantly greater radial thickness to give the hub structural strength and may terminate at one end with a flange 26 which may be apertured. Intermediate the ends thereof, the hub 24 is provided with an integrally formed radially extending annular metal diaphragm 28 which, about its outer periphery 30 is bolted as at 32 to the peripheral flange of the sleeve 18. The hub 24 has a hollow bore 34 and, in use, the end of a shaft 36, shown in broken lines, is inserted into the bore 34 and the hub is then shrink fitted to secure the hub 24 to the shaft end 36. This operation is conventional and may be carried out by first heating the hub 24 in any conventional manner such as by passing an electric current through the hub 24 or surrounding it with an electrically heatable member. The heat slightly expands the hub to allow insertion of the shaft end 36. The assembled elements are then allowed to cool or are positively cooled. With the shaft end 36 in place, shrinkage is limited so that the diaphragm 28 may be unable to assume a stable condition, where the surface of the diaphragm is symmetrical about a radial plane passing through the axis of rotation 8 of the coupling and substantially unstressed. Instead, the diaphragm may assume one one of two conditions both of which are illustrated in FIG. 1 at opposite ends of the assembly. At the right end of FIG. 1, the diaphragm 28 assumes or is made to assume a deflected position while at the left end of FIG. 1, the diaphragm 28' is substantially flat. Neither of these conditions is desirable for the reasons note above and described below. To manufacture hubs with diaphragms exactly dimensioned to compensate for the presence of the shaft end of a customer is generally not economically feasible.

As noted earlier, the deflected condition of the diaphragm 28 as shown to the right in FIG. 1 is undesirable for a number of reasons. For example, in the event vibrations are experienced during operation or misalignment, the diaphragm 28 which is already under stress is likely to fail much earlier than a diaphragm that is unstressed. The undeflected diaphragm 28' on the left of FIG. 1 is liable to suddenly pop or reverse its position relative to the radial plane of symmetry. This can cause disturbances in the torque transmission which can result in damage to the drive as well as the driven machinery and lead to early failure of the coupling. In the event of misalignment of the shafts such as where another shaft is attached to the other hub 24', sudden deflection of the diaphragm 28 of either hub can have similar undesirable results. Where the rotational speed is high and/or the torque load magnitude large, failure of the coupling often may result due to the instability of one or both diaphragms.

Figure 3:
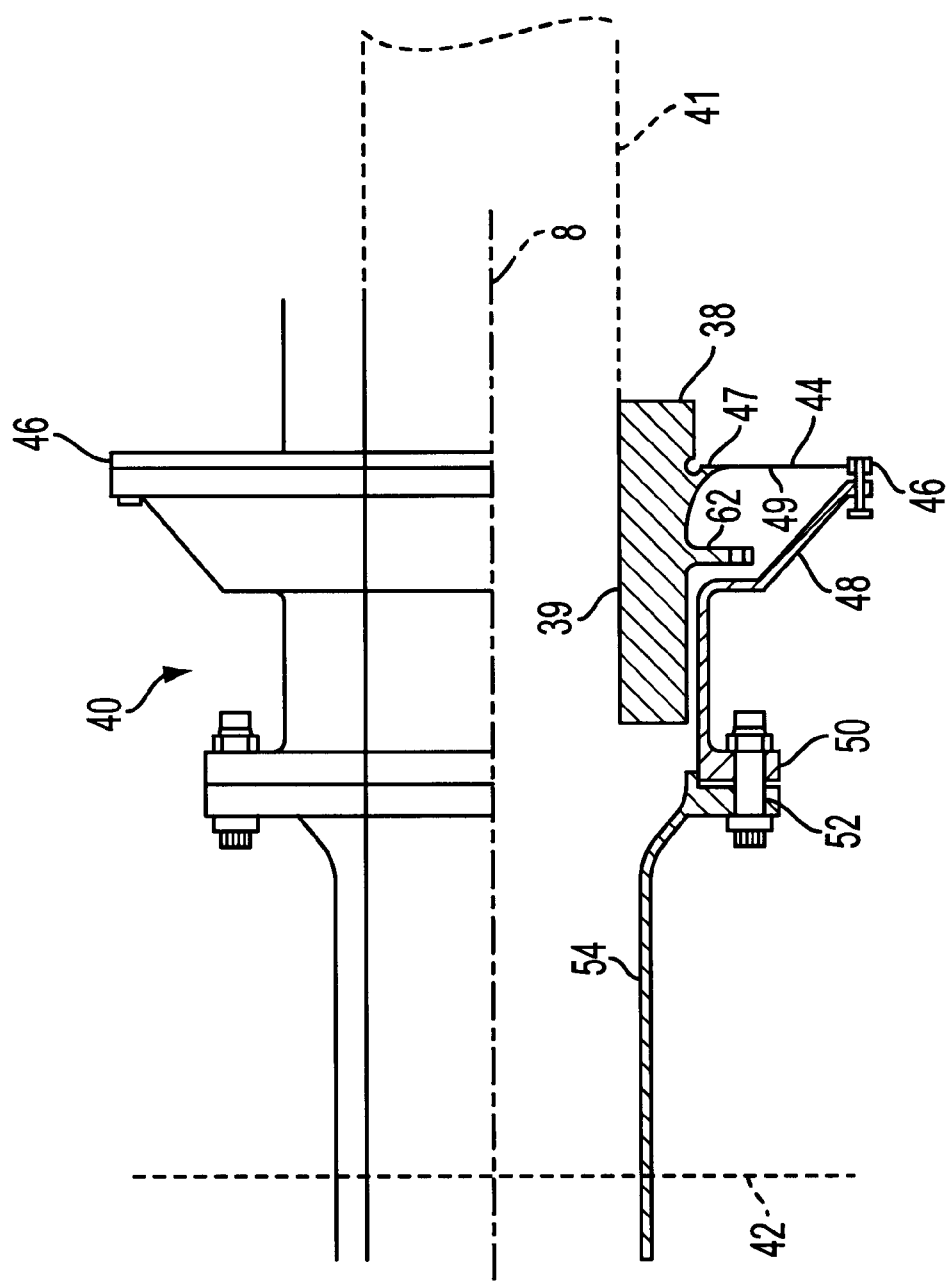
FIG. 3 is a closeup view similar to FIG. 2 and showing significant dimensional relations.
Figure 4:
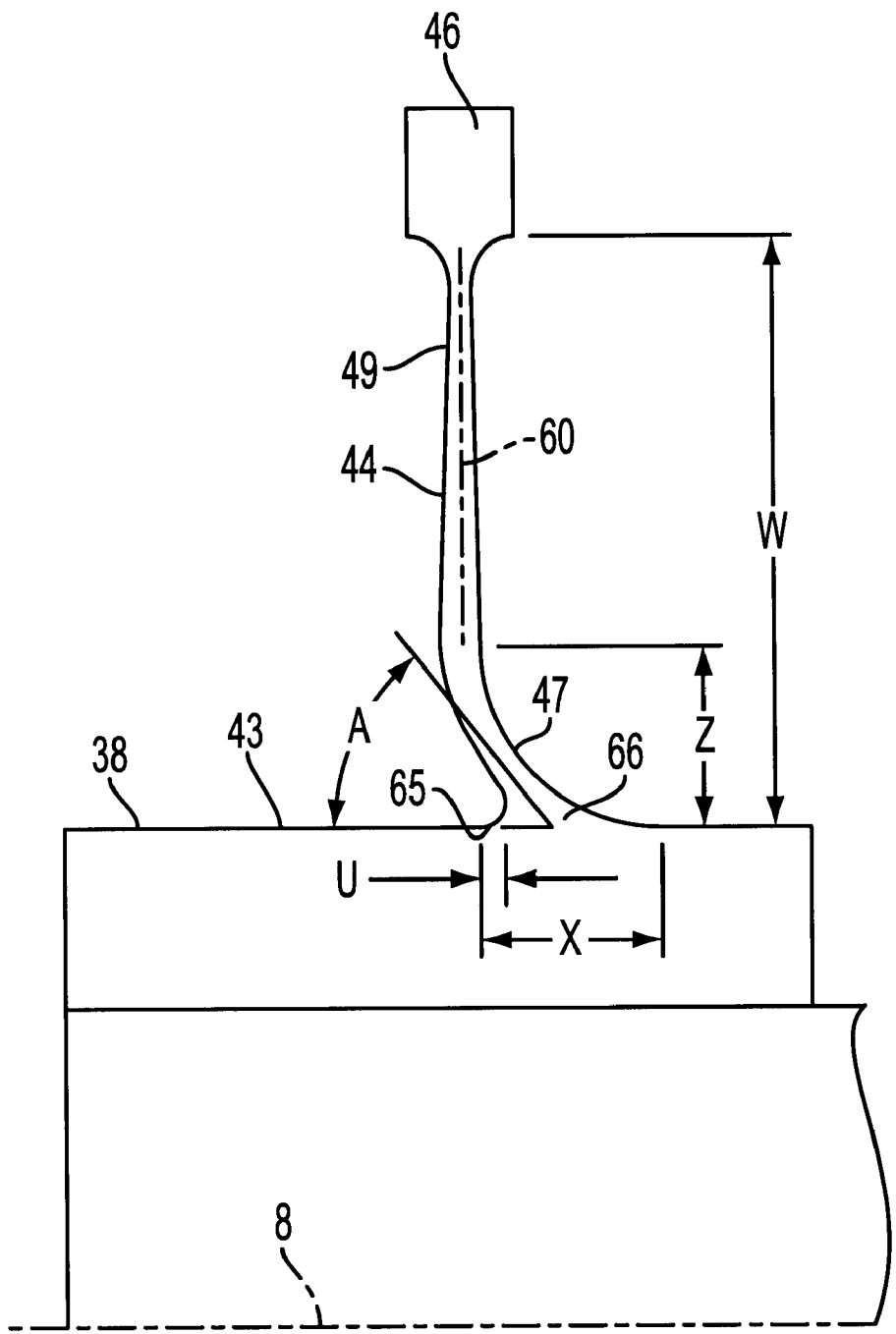
FIG. 4 is a sectional view in elevation taken perpendicular to the axis of a bub 38.

According to the present invention, as shown in FIGS. 3 and 4, an improved coupling hub 38 and assembly 40 are provided. It will be understood that the coupling assembly 40 is symmetrical about plane 42 and that only the right hand end will be described. Further, it will be understood that in some applications, only a single coupling hub 38 may be required. As shown in FIG. 3, the hub 38 has a hollow bore 39 for receiving the end of a drive or driven shaft 41 shown in broken lines. The outer surface 43 of the hub 38 is formed by machining with a large generally radially extending diaphragm 44 which differs in construction from the prior diaphragms in that the inner portion 47 adjacent the surface 43 is formed in a curved shape while the outer portion 49 is substantially symmetrical relative to a radial plane 60 (FIG. 4) that extends perpendicular to the axis of rotation 8. Preferably the diaphragm 44 is located intermediate the ends of the hub 38 and may include a packing or storage flange 62 to permit locking the hub 38 inside an outer flared sleeve 48 during storage or transport by bolting in bores 63 of the sleeve 48.

Certain dimensional relationships have been determined for the structure of the diaphragm 44 and hub 38 that improve its durability and operation. With reference to the schematic view of FIG. 4, the depth of the cut 65 designated u in the Figure should be positive so that the inner point is offset beyond the non curved portion 49 of the diaphragm. This will allow the portion 40 to flex in a radial direction without deflecting or buckling portion 49 significantly from the radial plane of symmetry 60. Preferably, the radial height Z of the inner portion 47 above the surface 43 should be between 10% and 50% of the radius W of the diaphragm 44. Further, the angular position of the inner portion 47 relative to the surface 43 should in the range of 15° to 75° to assure reasonable functionality.

While the invention has been described in the context of a metal diaphragm and hub, it will be understood by those skilled in this art that other coupling materials may also be employed particularly in other operating conditions than those described.

What is claimed is:

1. A flexible coupling comprising a sleeve with a hollow bore into which is shrink fitted one of a drive or driven shaft, said sleeve having an axis of rotation and an exterior surface, a flexible connection diaphragm provided around and extending from said exterior surface, said diaphragm having a first inner portion and a second radially outer portion, said second radially outer portion extending substantially radially relative to said axis of rotation, said first inner portion being curved arcuately from the second portion to said exterior surface, said second radially outer portion terminating in a peripheral flange having bores for attachment to the other of the drive or driven shaft, said first portion and said second portion extending a selected height from said exterior surface and said first portion having a height extending from said exterior surface between 10% and 50% of the height that said first portion and said second portion extend from said exterior surface.

2. The sleeve as claimed in claim 1 wherein said first inner and second radially outer portions are formed integrally.

3. The sleeve as claimed in claim 2 wherein said sleeve and said flexible connection diaphragm are formed integrally.

4. The sleeve as claimed in claim 1 wherein said flexible connection diaphragm tapers in thickness uniformly from said exterior surface to said peripheral flange.

5. The sleeve as claimed in claim 1 wherein said second portion of said flexible diaphragm lies substantially along a radial plane and said first inner portion lies outside of said plane.

6. A flexible coupling of the type comprising a sleeve with a hollow bore into which is shrink fitted one of a drive or driven shaft, said sleeve having an axis of rotation and an exterior surface, a flexible connection diaphragm provided around and extending from said exterior surface, said diaphragm having a first inner portion and a second radially outer portion, said second radially outer portion extending substantially radially relative to said axis of rotation, said first inner portion being curved arcuately from the second portion to said exterior surface, said second radial outer portion terminating in a peripheral flange having bores for attachment to the other of the drive or driven shaft, a major portion of said first inner portion extending within an angular range of 15° to 75° to said exterior surface.

* * * * *